United States Patent
McCready et al.

(10) Patent No.: US 12,049,555 B2
(45) Date of Patent: Jul. 30, 2024

(54) HIGH PERFORMANCE SINGLE-COMPONENT HOT MELT SEALANT COMPOSITION

(71) Applicant: BOSTIK SA, Colombes (FR)

(72) Inventors: Peadar McCready, Staffordshire (GB); Sylwia Druzdz, Staffordshire (GB); Matthew Thomas, Staffordshire (GB)

(73) Assignee: BOSTIK SA, Colombes (FR)

( * ) Notice: Subject to any disclaimer, the term of this patent is extended or adjusted under 35 U.S.C. 154(b) by 953 days.

(21) Appl. No.: 16/981,155

(22) PCT Filed: Mar. 1, 2019

(86) PCT No.: PCT/EP2019/055118
§ 371 (c)(1),
(2) Date: Sep. 15, 2020

(87) PCT Pub. No.: WO2019/174930
PCT Pub. Date: Sep. 19, 2019

(65) Prior Publication Data
US 2021/0017370 A1    Jan. 21, 2021

(30) Foreign Application Priority Data
Mar. 16, 2018 (EP) .................... 18305296

(51) Int. Cl.
*C08L 23/22* (2006.01)
*C03C 27/10* (2006.01)
*C08K 5/544* (2006.01)

(52) U.S. Cl.
CPC .............. *C08L 23/22* (2013.01); *C03C 27/10* (2013.01); *C08K 5/544* (2013.01); *C08L 2203/162* (2013.01); *C08L 2205/03* (2013.01)

(58) Field of Classification Search
CPC .............. C08L 23/22; C08L 2203/162; C08L 2205/03; C08L 23/16; C03C 27/10; C08K 5/544; C08K 3/26; C08K 5/541
See application file for complete search history.

(56) References Cited

U.S. PATENT DOCUMENTS

2007/0270541 A1* 11/2007 Davison ................. C09J 123/22
524/515

FOREIGN PATENT DOCUMENTS

EP     1462500 A1    9/2004

OTHER PUBLICATIONS

International Search Report for PCT/EP2019/055118 dated May 7, 2019.

* cited by examiner

*Primary Examiner* — Angela C Scott
(74) *Attorney, Agent, or Firm* — MILLEN, WHITE, ZELANO & BRANIGAN, P.C.; Csaba Henter

(57) ABSTRACT

The subject of the present invention relates to an improved high performance, hot melt, single-component sealant composition comprising:
(a) an elastomer selected from butyl rubber, polyisobutylene rubber, ethylene-propylene rubber, and mixtures thereof,
(b) an inorganic filler, and
(c) an adhesion promoter comprising an epoxy-based silane and an amino-based silane, wherein the weight ratio between the epoxy-based silane and the amino-based silane ranges from 60/40 to 90/10.

The present invention also relates to the use of said sealant composition as an edge sealant in insulating glass structures, such as windows or doors. Finally, the invention relates to an insulated glass structure comprising a sealant composition according to the invention.

19 Claims, No Drawings

HIGH PERFORMANCE SINGLE-COMPONENT HOT MELT SEALANT COMPOSITION

The present invention relates to an improved high performance, hot melt, single-component sealant composition. The present invention further relates to the use of said sealant composition as an edge sealant in insulating glass (IG) structures, such as windows or doors. Finally, the invention relates to an insulated glass structure comprising a sealant composition according to the invention.

Two types of glass sealant compositions are currently used in the IG sealant market. One type is a two-component chemically-cured sealant. These sealant compositions are based on polymers such as polyurethanes, polysulfides, mercaptan-modified polyether polyurethanes, and two-component silicones. The other type is a non-curing single-component sealant composition which is applied to a surface at high temperatures. These sealant compositions are usually butyl rubber-based.

Two-component sealant compositions generally demonstrate superior performance in fully assembled windows. After application, they cure irreversibly to form solid thermoset elastomeric sealants. As a result of the curing process, two-component sealant compositions exhibit good retention of elastomeric properties at elevated temperatures and good elastic recovery. Also, due to their inherent formulation ingredients, two-component sealant compositions exhibit good low temperature flexibility at temperatures as low as −40° C. Two-component sealant compositions are generally formulated with organo silane adhesion promoters which function as coupling agents between the sealant and glass substrates. The resulting chemical bond enables the sealant to withstand water immersion and low temperature exposure.

However, two-component sealant compositions have application limitations and disadvantages related to their two-part nature. In using these sealants, both the ratio of components and their mixing is important and must be precise. If there is any error in the ratio of the components, or if improper mixing occurs, the sealant will not cure properly and/or will not adequately chemically adhere to a substrate. Also, two-component sealants have limited worklife and cure times. Once the components of the sealant are mixed they begin to react to form a thermoset crosslinked structure. The reaction is irreversible and cannot be terminated. This creates problems if the reaction occurs too rapidly while the sealant composition is being applied or if curing occurs during any equipment shutdowns. During equipment shutdowns, the equipment must be thoroughly purged of mixed sealant or the sealant will cure in the equipment. Purging wastes materials and time, thus adding costs to the final product. Further, if the sealant composition has not properly cured, it is paste-like and if applied to a window in this form it does not have the mechanical properties to sufficiently hold the window together. Any premature handling or movement of the window causes premature cohesive failure of the sealant, and/or sealant-to-substrate bond delamination. Also, slow curing of the sealant composition requires that the window manufacturing facilities have staging areas to allow the sealant composition to properly cure. This lost time and space results in higher costs.

Further disadvantages of two-component sealant compositions are that their use in window manufacture cannot be automated easily since they cure slowly and are only paste-like immediately after application. Also, the moisture vapor transmission rates (MVTR) of two-component sealant compositions are not sufficient for single-seal window applications. To maintain low moisture vapor transmission through an edge seal, a polyisobutylene rubber primary seal is generally used making the manufacturing processes more complex, resulting in added costs.

Single-component sealant compositions applied at high temperatures generally have better properties at the point of sealant application, as compared to two-component sealant compositions. Mixing of two-components is not required in using a single-component sealant composition, therefore there is no waste associated with purged materials as in two-component sealant compositions. Staging areas are also not required as in slow cure two-component sealant compositions. Further, window units can be handled and moved immediately after manufacture. The window manufacturing process using single-component sealant compositions can be easily automated. Besides, current linear extruder application technology requires the use of single-component sealant compositions applied at high temperatures. Most single-component sealant compositions are butyl rubber-based, and thus exhibit an inherent low moisture vapor transmission rate which allows the sealant compositions to be used as a single seal. Windows using a single-edge sealant are less complex to manufacture and require fewer materials, resulting in reduced costs. Industry testing has shown butyl rubber-based sealants to perform reliably at considerable cost advantage.

Butyl rubber-based sealant compositions have none of the cure associated application liabilities. They are used as sealants for insulated glass window manufacture without otherwise employing a post application cure mechanism. Thus, they offer uncomplicated application parameters along with the elimination of cure time window handling requirements. Industry testing has shown butyl sealants to perform reliably at considerable cost advantage.

However, hot melt, single-component sealant compositions have disadvantages related to lower performance properties. They are non-curing, and thus do not perform well under high temperature static loads. Their solid elastomeric properties at room temperature always can revert back to a liquid state upon heating. Also, single-component sealant compositions do not cure and do not chemically bond to glass, so that the mechanical bond can be adversely affected by low temperatures and water at the bond interface.

The Inventors have now overcome these drawbacks by developing a high performance, hot melt, single-component sealant composition combining the advantages of both single- and two-component sealant compositions in that it performs as a hot melt single-component sealant during application and additionally has the overall performance properties of two-component sealants. The hot melt, single-component sealant of the invention has advantages as compared to existing single- and two-component sealants in that it shows improved heat resistance and cohesive strength, and greater slump resistance. In addition, the sealant composition of the invention provides a very good MVTR and Argon gas permeability performance, which allows it to function as a single seal.

Thus, the first subject of the invention is a sealant composition comprising:
(a) an elastomer selected from butyl rubber, polyisobutylene rubber, ethylene-propylene rubber, and mixtures thereof,
(b) an inorganic filler, and
(c) an adhesion promoter comprising an epoxy-based silane and an amino-based silane, wherein the weight ratio between the epoxy-based silane and the amino-based silane ranges from 60/40 to 90/10.

With respect to component (a), butyl rubber is the common designation for a copolymer of isobutylene and isoprene, usually with a quantity of 1 to 2 wt % of isoprene. The ethylene-propylene rubber includes EPM and EPDM rubbers. The term EPM designates a copolymer of ethylene and propylene. The term EPDM designates a terpolymer of Ethylene, Propylene and a Diene Monomer.

According to a preferred embodiment, the elastomer (a) is butyl rubber, and more preferably a mixture of butyl rubbers.

The sealant composition of the invention advantageously comprises from 5 to 65 wt %, and preferable from 15 to 40 wt %, of elastomer (a), based on the total weight of the sealant composition.

The inorganic filler (b) may be selected from a plurality of materials such as chalks, natural or ground or precipitated calcium carbonates, calcium magnesium carbonates, silicates, talc, heavy spar and carbon black.

According to a preferred embodiment, the inorganic filler is calcium carbonate. In a more preferred embodiment, it is a mixture of precipitated calcium carbonate and ground calcium carbonate, wherein the weight ratio between the precipitated calcium carbonate and the ground calcium carbonate ranges preferably from 50/50 to 30/70, and more preferably from 45/55 to 35/65. The combination of the two fillers grades contributes to reinforcing the sealant composition without compromising the flexibility of the material.

Precipitated calcium carbonates may have an average size within the range of 40-70 nm, and/or a specific surface area of 20-35 $m^2 \cdot g^{-1}$. It may be coated for example with calcium stearate (or a similar material that can impart full or partial hydrophobicity to the particles). It is preferable that the precipitated calcium carbonate has a coating level of 0-5 wt % with respect to the total weight of the precipitated calcium carbonate. The particle diameter $d_{50}$ of the precipitated calcium carbonate ranges preferably from 0.02 to 2 µm. Ground calcium carbonate may also be coated with calcium stearate or similar material that can impart full or partial hydrophobicity to the particles. The particle diameter $d_{50}$ of the ground calcium carbonate ranges preferably from 2 to 7 µm.

The sealant composition of the invention may advantageously comprise from 10 to 60 wt %, and preferably from 15 to 40 wt %, of inorganic filler (b), based on the total weight of the sealant composition.

With respect to component (c), the adhesion promoter comprises an epoxy-based silane and an amino-based silane in a specific ratio. The weight ratio between the epoxy-based silane and the amino-based silane ranges from 60/40 to 90/10, preferably from 65/35 to 85/15, and more preferably from 70/30 to 80/20.

Suitable epoxy-based silane for use in the present invention is of formula (I) or (II) below:

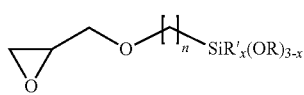
(I)

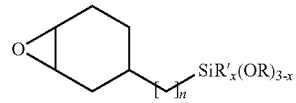
(II)

wherein:
R and R', the same or different, represent a linear or branched $C_1$ to $C_4$ alkyl group,
n is an integer equal to 1, 2, 3 or 4, and preferably equal to 2 or 3, and
x is an integer equal to 0, 1 or 2, and preferably equal to 0 or 1.

Specific epoxy-based silanes of the invention are: 3-glycidyloxymethyltrimethoxysilane, 3-glycidyloxymethyltriethoxysilane, 3-glycidoxymethyltripropoxysilane, 3-glycidoxymethyltributoxysilane, 2-glycidoxyethyltrimethoxysilane, 2-glycidoxyethyltriethoxysilane, 2-glycidoxyethyltripropoxysilane, 2-glycidoxyethyltributoxysilane, 3-glycidoxyethyltrimethoxysilane, 1-glycidoxyethyltriethoxysilane, 1-glycidoxyethyltripropoxysilane, 1-glycidoxyethyltributoxysilane, 3-glycidoxypropyltrimethoxysilane, 3-glycidoxypropyltriethoxysilane, 3-glycidoxypropyltripropoxysilane, 3-glycidoxypropyltributoxysilane, 2-glycidoxypropyltrimethoxysilane, 2-glycidoxypropyltriethoxysilane, 2-glycidoxypropyltripropoxysilane, 2-glycidoxypropyltributoxysilane, 1-glycidoxypropyltrimethoxysilane, 1-glycidoxypropyltriethoxysilane, 1-glycidoxypropyltripropoxysilane, 1-glycidoxypropyltributoxysilane, 3-glycidoxybutyltrimethoxysilane, 4-glycidoxybutyltriethoxysilane, 4-glycidoxybutyltripropoxysilane, 4-glycidoxybutyltributoxysilane, 4-glycidoxybutyltrimethoxysilane, 3-glycidoxybutyltriethoxysilane, 3-glycidoxybutyltripropoxysilane, 3-propoxybutyltributoxysilane, 4-glycidoxybutyltrimethoxysilane, 4-glycidoxybutyltriethoxysilane, 4-glycidoxybutyltripropoxysilane, 1-glycidoxybutyltrimethoxysilane, 1-glycidoxybutyltriethoxysilane, 1-glycidoxybutyltripropoxysilane, 1-glycidoxybutyltributoxysilane, 2-(3,4-epoxycyclohexyl)methyltrimethoxysilane, 2-(3,4-epoxycyclohexyl)methyltriethoxysilane, 2-(3,4-epoxycyclohexyl)methyltripropoxysilane, 2-(3,4-epoxycyclohexyl)methyltributoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyltripropoxysilane, 2-(3,4-epoxycyclohexyl)ethyltributoxysilane, 2-(3,4-epoxycyclohexyl)propyltrimethoxysilane, 2-(3,4-epoxycyclohexyl)propyltriethoxysilane, 2-(3,4-epoxycyclohexyl)propyltripropoxysilane, 2-(3,4-epoxycyclohexyl)propyltributoxysilane, 2-(3,4-epoxycyclohexyl)butyltrimethoxysilane, 2-(3,4-epoxycyclohexyl)butyltriethoxysilane, 2-(3,4-epoxycyclohexyl)butyltripropoxysilane, 2-(3,4-epoxycyclohexyl)butyltributoxysilane, 2-(3,4-epoxycyclohexyl)ethylmethyldimethoxysilane, and mixtures thereof. Instead of or together with the aforementioned trialkoxysilanes, the corresponding alkyldialkoxysilanes may also be used.

Particularly preferred epoxy-based silanes are 3-glycidoxyethyltrimethoxysilane, 3-glycidoxypropyltrimethoxysilane, 3-glycidoxypropyltriethoxysilane, 2-(3,4-epoxycyclohexyl)propyltrimethoxysilane, 2-(3,4-epoxycyclohexyl) ethylmethyldimethoxysilane, and mixtures thereof.

Suitable amino-based silane for use in the present invention is of formula (III) below:

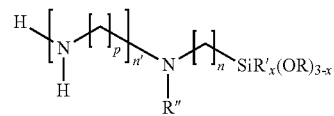
(III)

wherein:
R and R', the same or different, represent a linear or branched $C_1$ to $C_4$ alkyl group,
R" represents a hydrogen atom, a linear, branched or cyclic $C_1$ to $C_8$ alkyl group, or $C_4$ to $C_8$ alkylaryl or aromatic group, or a —$([CH_2]_q$—$NH)_{n'}$—H group,
n is an integer equal to 1, 2, 3 or 4, and preferably 3,
n' is an integer equal to 0, 1, 2, 3 or 4, and preferably 0 or 1,
p is an integer equal to 2, 3 or 4, and preferably 2 or 3,
q is an integer equal to 2, 3 or 4, and preferably 2 or 3, and
x is an integer equal to 0, 1 or 2, and preferably 0.

Specific amino-based silanes of the invention are: 3-aminopropyltrimethoxysilane (AMMO), 3-aminopropyltriethoxysilane (AMEO), 3-aminopropylmethyldimethoxysilane, 3-aminopropylmethyldiethoxysilane, N-(2-aminoethyl)-3-aminopropyltrimethoxysilane (DAMO), N-(2-aminoethyl)-3-am inopropyltriethoxysilane, N-(2-aminoethyl)-3-aminopropylmethyldimethoxysilane, N-(2-aminoethyl)-3-aminopropylmethyldiethoxysilane, N,N-di(2-aminoethyl)-1-3-aminopropyltrimethoxysilane, N,N-di(2-aminoethyl)-3-aminopropyltriethoxysilane, N,N-di(2-aminoethyl)-3-aminopropylmethyldimethoxysilane, N,N-di(2-aminoethyl)-3-aminopropylmethyldiethoxysilane, N-(2-aminoethyl)-N'-(2-aminoethyl)-3-aminopropyltrimethoxysilane, N-(2-aminoethyl)-N'-(2-amino-ethyl)-3-aminopropyltriethoxysilane, N-(2-aminoethyl)-N'-(2-aminoethyl)-1,3-aminopropylmethyldimethoxysilane, N-(2-aminoethyl)-N'-(2-aminoethyl)-1,3-aminopropylmethyldiethoxysilane, bis(triethoxysilylpropyl)amine, bis(trimethoxysilylpropyl)amine, N-(2-aminobutyl)-3-aminopropyltriethoxysilane, N-(2-aminobutyl)-3-aminopropyltrimethoxysilane, N-(2-aminoethyl)-3-aminopropyltrimethoxysilane, N-methylaminopropyltrimethoxysilane, N—(N-butyl)-3-aminopropyltrimethoxysilane, N—(N-butyl)-3-aminopropyltriethoxysilane, N—(N-butyl)-1,3-aminopropylalkoxydiethoxysilane, N-[3-(trimethoxysilyl)propyl]ethylenediamine,
and mixtures thereof. Instead of or together with the aforementioned propyl groups, another $C_1$ to $C_4$ alkyl group may also be used.

Particularly preferred amino-based silanes are N-(2-aminoethyl)-3-aminopropyltriethoxysilane, N-(2-aminoethyl)-3-am inopropyltrimethoxysilane, N-[3-(trimethoxysilyl)propyl]ethylenediamine, 3-aminopropyltriethoxysilane, 3-aminopropyltrimethoxysilane, 3-aminopropylmethyldiethoxysilane, N-methylaminopropyltrimethoxysilane, and mixtures thereof.

According to particularly advantageous embodiment, the adhesion promoter is a mixture of 3-glycidoxypropyltrimethoxysilane and N-[3-(trimethoxysilyl)propyl]ethylenediamine, the weight ratio between the epoxy-based silane and the amino-based silane ranging preferably from 70/30 to 80/20, and more preferably from 65/35 to 75/25.

The sealant composition of the invention may advantageously comprise from 0.1 to 5 wt %, and preferably from 0.1 to 2 wt %, of adhesion promoter (c), based on the total weight of the sealant composition.

The sealant composition of the invention may further comprise a thermoplastic polymer (d) such as polyalkylenes (e.g. polyethylene, polypropylene and polybutylene), poly-alpha-olefin polymer including, e.g. homo-, co- and terpolymers of aliphatic mono-1-olefins (alpha olefins) (e.g. $C_2$ to $C_{10}$ poly(alpha)olefins), homogeneous linear or substantially linear interpolymers of ethylene having at least one $C_3$ to $C_{20}$ alphaolefin, polyisobutylenes, poly(alkylene oxides), poly(phenylenediamine terephthalamide), polyesters (e.g. polyethylene terephthalate), polyacrylates, polymethacrylates, polyacrylamides, polyacrylonitriles, copolymers of acrylonitrile and monomers including, e.g. butadiene, styrene, polymethyl pentene, and polyphenylene sulfide (e.g. styrene-acrylonitrile, acrylonitrile-butadiene-styrene, acrylonitrile-styrene-butadiene rubbers), polyimides, polyamides, copolymers of vinyl alcohol and ethylenically unsaturated monomers, polyvinyl acetate (e.g. ethylene vinyl acetate), polyvinyl alcohol, vinyl chloride homopolymers and copolymers (e.g. polyvinyl chloride), terpolymers of ethylene, carbon monoxide and acrylic acid ester or vinyl monomer, polysiloxanes, polyurethanes, polystyrene, and combinations thereof, and homopolymers, copolymers and terpolymers thereof, and mixtures thereof. Other useful classes of thermoplastic polymers include asphalts, bitumens, crude rubbers, fluorinated rubbers, and cellulosic resins.

According to a preferred embodiment, the thermoplastic polymer (d) is selected from amorphous poly-alpha-olefin polymer, and preferably a propylene-based polymer selected from homopolymers of propylene or copolymers of propylene with one or more $C_2$ to $C_{10}$ alpha-olefins comonomers, copolymer of ethylene and vinyl acetate, copolymer of ethylene and ethyl acrylate, copolymer of ethylene and acrylic acid, polyethylene, polypropylene, polyamide, styrene-butadiene-styrene and styrene-isoprene-styrene block copolymers, and mixtures thereof. According to a more preferred embodiment, the thermoplastic polymer (d) is selected from amorphous poly-alpha-olefin polymer, copolymer of ethylene and vinyl acetate, polyethylene, and mixtures thereof.

The sealant composition of the invention may advantageously comprise from 2 to 30 wt %, and preferably from 10 to 25 wt %, of a thermoplastic polymer (d), based on the total weight of the sealant composition.

The sealant composition of the invention may further comprise a pigment (e), such as carbon black or titanium dioxide. According to a preferred embodiment, the pigment (e) is a carbon black pigment, possibly coated with polyethylene.

The sealant composition of the invention may advantageously comprise from 0 to 5 wt %, and preferably from 0.5 to 3 wt %, of a pigment (e), based on the total weight of the sealant composition.

The sealant composition of the invention may further comprise a tackifier resin (f). The tackifier resin modifies the solid and flow properties of the sealant. At melt application, the tackifier resin reduces the melting point and melt viscosity of the sealant, and wets the substrates. At room temperature, the tackifier resin provides the sealant with toughness and static load resistance. Examples of suitable tackifying agents include aliphatic, cycloaliphatic, aromatic, aliphatic-aromatic, aromatic modified alicyclic, and alicyclic hydrocarbon resins and modified versions and hydrogenated derivatives thereof; terpenes (polyterpenes), modified terpenes (e.g. phenolic modified terpene resins), hydrogenated derivatives thereof and mixtures thereof; alpha-methyl-styrene resins and hydrogenated derivatives thereof; and combinations thereof. Other tackifying agents include natural and modified rosins such as gum rosin, wood rosin, tall oil rosin, distilled rosin, completely or partially hydrogenated rosin, dimerized rosin and polymerized rosin; rosin esters including, e.g. glycerol and pentaerythritol esters of natural and modified rosins (e.g. glycerol esters of pale, wood rosin, glycerol esters of hydrogenated rosin, glycerol esters of polymerized rosin, pentaerythritol esters of hydrogenated rosin and phenolic-modified pentaerythritol esters of rosin); and mixtures thereof.

Particularly preferred tackifier resins (f) are hydrocarbon resins, rosin esters including, e.g. glycerol and pentaerythritol esters of natural and modified rosins, (e.g. glycerol esters of pale, wood rosin, glycerol esters of hydrogenated rosin, glycerol esters of polymerized rosin, pentaerythritol esters of hydrogenated rosin and phenolic-modified pentaerythritol esters of rosin), and mixtures thereof.

The tackifier resin (f) is preferably present in the sealant composition of the invention in an amount of from 5 to 50 wt %, and preferably from 10 to 35 wt %, based on the total weight of the sealant composition.

An antioxidant stabilizer (g) may also be added to protect the sealant composition of the present invention from degradation induced by heat, light, UV radiations, during processing and storage. Several types of antioxidants can be used, either primary antioxidants like hindered phenols or secondary antioxidants like phosphite derivatives or blends thereof.

The antioxidant stabilizer is preferably present in an amount of from 0.1 to 3 wt %, preferably from 0.1 to 2 wt %, based on the total weight of the sealant composition.

The sealant composition of the invention may also include other additives such as UV absorbers, waxes, lubricants, catalysts, rheology modifiers, biocides, corrosion inhibitors, dehydrators, organic solvents, surfactants, nucleating agents, flame retardants, and combinations thereof.

According to a particularly preferred embodiment, the sealant composition of the invention comprises:
 (a) 5 to 65 wt %, preferably from 15 to 40 wt %, of at least one elastomer selected from butyl rubber, polyisobutylene rubber, EPDM rubber, and mixtures thereof,
 (b) 10 to 60 wt %, preferably from 15 to 40 wt %, of at least one inorganic filler,
 (c) 0.1 to 5 wt %, preferably from 0.1 to 2 wt %, of an adhesion promoter comprising an epoxy-based silane and an amino-based silane, wherein the weight ratio between the epoxy-based silane and the amino-based silane ranges from 60/40 to 90/10,
 (d) 2 to 30 wt %, preferably from 10 to 25 wt %, of at least one thermoplastic polymer,
 (e) 0 to 5 wt %, preferably from 0.5 to 3 wt %, of at least one pigment,
 (f) 5 to 50 wt %, preferably from 10 to 35 wt %, of at least one tackifier resin,
 (g) 0.1 to 3 wt %, preferably from 0.1 to 2 wt %, of at least one antioxidant stabilizer, in which the sum of components (a), (b), (c), (d), (e), (f) and (g) is 100 wt %.

The method for preparing a sealant composition according to the invention comprises adding a part of elastomer(s) (a), a part of thermoplastic polymer(s) (d), pigment(s) (e), antioxidant stabilizer(s) (g), in a mixing device, heating the content of the mixing device under vacuum to a temperature greater than 100° C., and preferably greater than 120° C., then adding a part of organic filler(s) (b) and a part of thermoplastic polymer(s) (d), mixing until the mixture is uniform before adding the remaining of organic filler(s) (b), thermoplastic polymer(s) (d) and elastomer(s) (a), and the adhesion promoter (c). The mixture is maintained under vacuum during 1 to 2 hours, at the same temperature, until the ingredients are melted and uniformly blended.

The invention also relates to the use of a sealant composition according to the invention as an edge sealant in insulating glass structures, such as windows or doors. Two panes of glass may be held in a substantially parallel arrangement, separated by a spacer bar, with a sealant composition according to the invention introduced between the spacer bar and the panes of glass to form a sealed IG structure.

Another subject of the invention relates to an insulated glass structure comprising two parallel panes of glass separated by a spacer bar, wherein the two panes of glass are bonded to the spacer bar through a sealant composition according to the invention (double glazing). Another subject of the invention relates to an insulated glass structure comprising three parallel panes of glass separated by one or two spacer bars, wherein the three panes of glass are bonded to the spacer bar(s) through a sealant composition according to the invention (triple glazing). The insulated glass structure of the invention is preferably a window or a door.

The sealant composition of the invention may be applied to the surface of the panes of glass by hot melt pumps and linear extruders at a temperature from 140 to 250° C., preferably at a temperature of from 170 to 200° C., and more preferably at a temperature from 180 to 195° C., for instance by using any suitable applicator including a hand held glue gun, extruder, linear extruder, other forms of extruder beads, automated application equipment, and combinations thereof.

After application, the sealant composition cools forming a solid elastomer, and upon further exposure to atmospheric moisture forms a thermoset crosslinked network having the performance properties of a two-component sealant.

In addition to the preceding arrangements, the invention also comprises other arrangements which will emerge from the following further description which refers to examples demonstrating the advantageous properties of the sealant composition of the invention.

EXAMPLES

The test procedures used in the examples are the following:

Melt Flow Index (MFI):

The MFI was determined according to ASTM D1238.

Softening Point:

The softening point is determined by the Ring & Ball method according to ASTM D-36, using silicone oil as a medium.

High Temperature Vertical Slump Test:

This test is designed to assess the slump of a hot melt IG sealant applied by gun in vertical joints of a glazed unit.

Preparation of Cartridge:

A solid strip of hot melt sealant (300 g) is cut to fit into a standard aluminium cartridge. The cartridge is then placed in an oven at 190° C. for two hours to allow material to come to temperature. After two hours, a piston is inserted into the cartridge with a paperclip hooked on the cartridge and pushed down until in contact with the molten sealant and air is pressed out. The cartridge is then inserted into a preheated application gun and heats up to the application temperature (180-195° C.) of the sealant for at least 30 minutes.

Gunning Sealant into Channel:

Compressed air is switched on at a pressure of 5 bar. The outlet of the cartridge is pierced when the sealant is up to temperature of application (180-195° C.). The slump channel flat side (U shaped channel) is placed on release paper with the open side facing up. The sealant is applied into the channel ensuring the space is slightly overfilled to allow for a full channel. The full channel is overturned 180° on to the sealant side and pressed gently to the release paper to make sure that the material is fully packed into the channel. The channel is cooled down and conditioned for 24 hours at room temperature (23° C.).

Testing:

The channel is suspended vertically in a pre-heated oven at 60° C. securing it to a rack with paperclips. The slump is measured after 24 hours with callipers. If the slump measured after 24 hours is <3 mm, the temperature is increased to 70° C. and channels are subjected to a further 24 hours at 70° C. The process of increasing the temperature by 10° C. every 24 hours is repeated until slump is ≥3 mm. The test is stopped once slump is measured at ≥3 mm.

Tensile Properties:

This test measures the tensile properties (tensile strength and extensibility) of sealant compositions used in the insulating glass industry. These properties are determined according to the EN1279-4:2002.

Moisture Vapor Transmission Rate (MVTR):

The MVTR was determined according to ASTM E96-90. The test is conducted at 23° C. and 92% relative humidity on a sealant film having a thickness of 2 mm.

The raw materials used in the examples are listed in Table 1:

TABLE 1

| | Trade name | Supplier |
|---|---|---|
| Copolymer of isobutylene-isoprene - Low unsaturation (0.90 ± 0.20 mol %) | X_Butyl ® RB100 | ARLENXEO |
| Copolymer of isobutylene-isoprene - Medium unsaturation (1.85 ± 0.20 mol %) | X_Butyl ® RB301 | ARLENXEO |
| Pentaerythritol tetrakis(3,5-di-tert-butyl-4-hydroxyhydrocinnamate) | Irganox ® 1010 | BASF |
| Black Master batch Low Density Polyethylene (LDPE) | Plasblack ® PE1371 | CABOT |
| Low Density Polyethylene (LDPE) | 1200 MN 18C | TOTAL |
| Ground Calcium Carbonate ($d_{50}$ = 3.4 μm) | PolCarb ® 29 | IMERYS |
| Amorphous poly-alpha-olefin (APAO) (R&B softening point = 124° C.) | Vestoplast ® 703 | EVONIK |
| Precipitated Calcium Carbonate (surface area = 19-25 m²/g) | Calofort ® SM | SPECIALITY MINERAL |
| Hydrogenated hydrocarbon resin (R&B softening point = 130° C.) | Eastotac ™ H130R | EASTMAN |
| N-(2-aminoethyl)-3-aminopropyltrimethoxysilane | Dynasylan ® DAMO-T | DYNASYLAN |
| Copolymer of ethylene and vinyl acetate (R&B softening point = 84° C.) | Evatane ® 28-420 | ARKEMA |
| Glycerol ester of rosin (R&B softening point = 94° C.) | Eastman ™ Ester Gum 8D Resin | EASTMAN |
| Polyisobutene (Mn = 1,500 g/mol, PDI = 2.0) | Glissopal ® V640 | BASF |
| 3-Glycidoxy-propyltrimethoxysilane | Silquest ® A-187 | MOMENTIVE |

Preparation of a Sealant Composition According to the Invention (Composition A with an Epoxy-Based Silane/Amino-Based Silane Weight Ratio of 75/25):

A sealant composition A was prepared by charging sequentially 85 g of X_Butyl™ RB100 butyl rubber, 85 g of X_Butyl™ RB301 butyl rubber, 2.4 g of antioxidant Irganox 1010, 9.5 g of pigment Plasblack® PE1371, and 9.5 g 1200 MN 18C Low Density Polyethylene (LDPE), into a Z blade mixer (Sigma blade) that has been preheated to 130° C., equipped with a vacuum pump at low speed mixing. The mixture was then agitated on fast speed for 20 minutes. The mixture was once again agitated at a slow speed, so as to add sequentially 135 g of calcium carbonate Polcarb™ 29 and 60 g of amorphous poly-alpha-olefin (APAO) Vestoplast® 703. The mixture was agitated for additional 5 minutes, before sequentially adding 90 g of calcium carbonate Calofort® SM, 87.5 g of hydrocarbon resin Eastotac™ H130R, 87.5 g of ethylene vinyl acetate copolymer Evatane® 28-420, and 87.5 g of rosin ester Eastman™ ester Gum 8D Resin. The mixture was agitated for additional 5 minutes, before sequentially adding 65 g polyisobutene Glissopal® V640 and 3 g of epoxy-based silane Silquest A187. The mixture was agitated for additional 5 minutes before adding 1 g of amino-based silane Dynasylan® DAMO-T. The mixture was agitated for additional one minute before applying vacuum to −700 millibars for 1 hour 15 minute, always at 130° C.

Preparation of a Sealant Composition Outside the Invention (Composition B without Amino-Based Silane):

A sealant composition B was prepared by charging sequentially 85 g of X_Butyl™ RB100 butyl rubber, 85 g of X_Butyl™ RB301 butyl rubber, 2.4 g of antioxidant Irganox 1010, 9.5 g of pigment Plasblack® PE1371, and 9.5 g 1200 MN 18C Low Density Polyethylene (LDPE), into a Z blade mixer (Sigma blade) that has been preheated to 130° C., equipped with a vacuum pump at low speed mixing. The mixture was then agitated on fast speed for 20 minutes. The mixture was once again agitated at a slow speed, so as to add sequentially 225 g of calcium carbonate Polcarb™ 29 and 60 g of amorphous poly-alpha-olefin (APAO) Vestoplast® 703. The mixture was agitated for additional 5 minutes, before sequentially adding 87.5 g of hydrocarbon resin Eastotac™ H130R, 87.5 g of ethylene vinyl acetate copolymer Evatane® 28-420, and 87.5 g of rosin ester Eastman™ ester Gum 8D Resin. The mixture was agitated for additional 5 minutes, before sequentially adding 65 g polyisobutene Glissopal® V640 and 4 g of epoxy-based silane Silquest A187. The mixture was agitated for additional one minute before applying vacuum to −700 millibars for 1 hour 15 minute, always at 130° C.

Preparation of a Sealant Composition Outside the Invention (Composition C without Amino-Based Silane):

A sealant composition C was prepared by charging sequentially 85 g of X_Butyl™ RB100 butyl rubber, 85 g of X_Butyl™ RB301 butyl rubber, 2.4 g of antioxidant Irganox 1010, 9.5 g of pigment Plasblack® PE1371, and 9.5 g 1200 MN 18C Low Density Polyethylene (LDPE), into a Z blade mixer (Sigma blade) that has been preheated to 130° C., equipped with a vacuum pump at low speed mixing. The mixture was then agitated on fast speed for 20 minutes. The mixture was once again agitated at a slow speed, so as to add sequentially 135 g of calcium carbonate Polcarb™ 29 and 60 g of amorphous poly-alpha-olefin (APAO) Vestoplast® 703. The mixture was agitated for additional 5 minutes, before sequentially adding 90 g of calcium carbonate Calofort® SM, 87.5 g of hydrocarbon resin Eastotac™ H130R, 87.5 g of ethylene vinyl acetate copolymer Evatane® 28-420, and 87.5 g of rosin ester Eastman™ ester Gum 8D Resin. The mixture was agitated for additional 5 minutes, before sequentially adding 65 g polyisobutene Glissopal® V640 and 4 g of epoxy-based silane Silquest A187. The mixture was agitated for additional one minute before applying vacuum to −700 millibars for 1 hour 15 minute, always at 130° C.

Preparation of a Sealant Composition Outside the Invention (Composition D with an Epoxy-Based Silane/Amino-Based Silane Weight Ratio of 50/50):

A sealant composition D was prepared by charging sequentially 85 g of X_Butyl™ RB100 butyl rubber, 85 g of X_Butyl™ RB301 butyl rubber, 2.4 g of antioxidant Irganox 1010, 9.5 g of pigment Plasblack® PE1371, and 9.5 g 1200 MN 18C Low Density Polyethylene (LDPE), into a Z blade mixer (Sigma blade) that has been preheated to 130° C., equipped with a vacuum pump at low speed mixing. The mixture was then agitated on fast speed for 20 minutes. The mixture was once again agitated at a slow speed, so as to add sequentially 112.5 g of calcium carbonate Polcarb™ 29 and 60 g of amorphous poly-alpha-olefin (APAO) Vestoplast® 703. The mixture was agitated for additional 5 minutes, before sequentially adding 112.5 g of calcium carbonate Calofort® SM, 87.5 g of hydrocarbon resin Eastotac™ H130R, 87.5 g of ethylene vinyl acetate copolymer Evatane® 28-420, and 87.5 g of rosin ester Eastman™ ester Gum 8D Resin. The mixture was agitated for additional 5 minutes, before sequentially adding 65 g polyisobutene Glissopal® V640 and 2 g of epoxy-based silane Silquest A187. The mixture was agitated for additional 5 minutes before adding 2 g of amino-based silane Dynasylan® DAMO-T. The mixture was agitated for additional one minute before applying vacuum to −700 millibars for 1 hour 15 minute, always at 130° C.

Preparation of a Sealant Composition Outside the Invention (Composition E with an Epoxy-Based Silane/Amino-Based Silane Weight Ratio of 50/50):

A sealant composition E was prepared by charging sequentially 85 g of X_Butyl™ RB100 butyl rubber, 85 g of X_Butyl™ RB301 butyl rubber, 2.4 g of antioxidant Irganox 1010, 9.5 g of pigment Plasblack® PE1371, and 9.5 g 1200 MN 18C Low Density Polyethylene (LDPE), into a Z blade mixer (Sigma blade) that has been preheated to 130° C., equipped with a vacuum pump at low speed mixing. The mixture was then agitated on fast speed for 20 minutes. The mixture was once again agitated at a slow speed, so as to add sequentially 225 g of calcium carbonate Polcarb™ 29 and 60 g of amorphous poly-alpha-olefin (APAO) Vestoplast® 703. The mixture was agitated for additional 5 minutes, before sequentially adding 87.5 g of hydrocarbon resin Eastotac™ H130R, 87.5 g of ethylene vinyl acetate copolymer Evatane® 28-420, and 87.5 g of rosin ester Eastman™ ester Gum 8D Resin. The mixture was agitated for additional 5 minutes, before sequentially adding 65 g polyisobutene Glissopal® V640 and 2 g of epoxy-based silane Silquest A187. The mixture was agitated for additional 5 minutes before adding 2 g of amino-based silane Dynasylan® DAMO-T. The mixture was agitated for additional one minute before applying vacuum to −700 millibars for 1 hour 15 minute, always at 130° C.

The ingredients and their weight percentages (wt %) in compositions A, B, C, D and E are gathered in Table 2 below:

TABLE 2

| | Composition A | Composition B | Composition C | Composition D | Composition E |
|---|---|---|---|---|---|
| X_Butyl ™ RB100 butyl rubber | 10.52 | 10.52 | 10.52 | 10.52 | 10.52 |
| X_Butyl ™ RB301 butyl rubber | 10.52 | 10.52 | 10.52 | 10.52 | 10.52 |
| Irganox 1010 | 0.30 | 0.30 | 0.30 | 0.30 | 0.30 |
| Plasblack ® PE1371 | 1.18 | 1.18 | 1.18 | 1.18 | 1.18 |
| 1200 MN 18C (LDPE) | 1.18 | 1.18 | 1.18 | 1.18 | 1.18 |
| Polcarb ™ 29 | 16.71 | 27.85 | 16.71 | 13.92 | 27.85 |
| Vestoplast ® 703 (APAO) | 7.43 | 7.43 | 7.43 | 7.43 | 7.43 |
| Calofort ® SM | 11.14 | — | 11.14 | 13.92 | — |
| Eastotac ™ H130R hydrocarbon resin | 10.83 | 10.83 | 10.83 | 10.83 | 10.83 |
| Evatane ® 28-420 ethylene vinyl acetate copolymer | 10.83 | 10.83 | 10.83 | 10.83 | 10.83 |
| Eastman ™ ester Gum 8D Resin | 10.83 | 10.83 | 10.83 | 10.83 | 10.83 |
| Glissopal ® V640 | 8.05 | 8.05 | 8.05 | 8.05 | 8.05 |
| Silquest A187 epoxy-based silane | 0.37 | 0.50 | 0.50 | 0.25 | 0.25 |
| Dynasylan ® DAMO-T amino-based silane | 0.12 | — | — | 0.25 | 0.25 |

Compositions A, B, C, D and E were tested according to Melt Flow Index (MFI), softening point, and High Temperature Vertical Slumps tests described above.

TABLE 3

| | MFI | Softening point (° C.) | | High Temperature Vertical Slumps (mm) | | | |
|---|---|---|---|---|---|---|---|
| | (g/10 min) | Initial | Final | 70° C. | 80° C. | 90° C. | 100° C. |
| Composition A | 88 | 104 | 167 | 0 | 0 | 1.5 | 2.6 |
| Composition B | 104 | 97 | 164 | 3.8 | 19.5 | Fail | Fail |
| Composition C | 107 | 98 | 172 | NA | NA | NA | NA |
| Composition D | 71 | 102 | 192 | NA | NA | NA | NA |
| Composition E | 93 | 96 | 168 | 8.8 | 23.1 | Fail | Fail |

NA: Not applicable

The High Temperature Vertical Slumps of Compositions C and D could not be measured because both sealant compositions were not suitable. Their very high final softening points mean a poor rheology, which pose problem of application.

It follows from Table 3 that Composition A gains in heat resistance compared to the other sealant compositions. Composition A is the only composition resisting until 100° C.

The tensile properties of compositions A, B and E were tested according to the test described above, under different conditions as described in EN1279-4:2002:

TABLE 4

| | Composition A | | | | Composition B | | | |
|---|---|---|---|---|---|---|---|---|
| | Unaged | 60° C. | Water | UV | Unaged | 60° C. | Water | UV |
| Peak force (N) | 108 | 121 | 119 | 123 | 104 | 107 | 101 | 107 |
| Peak stress (MPa) | 0.18 | 0.20 | 0.20 | 0.20 | 0.17 | 0.18 | 0.16 | 0.18 |
| Peak strain (%) | 30.3 | 27.7 | 29.5 | 29.1 | 30.2 | 29.7 | 30.2 | 30.4 |
| Strain at fail (%) | 264 | 353 | 280 | 342 | 329 | 300 | 337 | 310 |
| Stress at fail (MPa) | 0.05 | 0.06 | 0.07 | 0.06 | 0.05 | 0.06 | 0.05 | 0.06 |
| Young's modulus (MPa) | 2.0 | 2.3 | 2.3 | 2.5 | 1.8 | 1.9 | 1.5 | 1.8 |
| Mode of fail | CF | CF | CF/SCF | CF/SCF | CF | CF | CF | CF |

| | Composition E | | | |
|---|---|---|---|---|
| | Unaged | 60° C. | Water | UV |
| Peak force (N) | 97 | 106 | 100 | 97 |
| Peak stress (MPa) | 0.16 | 0.18 | 0.17 | 0.16 |
| Peak strain (%) | 33.2 | 32.6 | 31.5 | 34.5 |
| Strain at fail (%) | 269 | 302 | 283 | 303 |
| Stress at fail (MPa) | 0.05 | 0.05 | 0.05 | 0.05 |
| Young's modulus (MPa) | 1.5 | 1.6 | 1.6 | 1.5 |
| Mode of fail | CF | CF | CF | CF |

*CF = Cohesive Fail, SCF = Surface Cohesive Fail, AF = Adhesive Fail

It follows from Table 4 that Composition A shows improved mechanical performances, at room and elevated temperatures, as well as under water and after UV exposure.

Compositions A and B were tested according to MVTR test described above:

TABLE 5

| | MVTR (g/m$^2$/24 h/2 mm) |
|---|---|
| Composition A | 0.06 |
| Composition B | 0.10 |

The stability of Composition A was tested by forming the sealant composition samples into 1 and 2 cm thick films and keeping for up to 63 days at room temperature (23° C.), and then by measuring the MFI (g/10 min) at random time during the 63 days. The values are the result of three measures.

TABLE 6

| | MFI (g/10 min) | | | | | | | | | | | | |
|---|---|---|---|---|---|---|---|---|---|---|---|---|---|
| Days | 0 | 1 | 4 | 6 | 8 | 15 | 22 | 28 | 35 | 42 | 49 | 56 | 63 |
| Sample of 1 cm thick | 76 | 76 | 75 | 76 | 77 | 75 | 77 | — | — | 75 | 77 | — | — |
| Sample of 2 cm thick | 87 | — | — | — | — | — | 85 | 83 | 82 | 85 | 82 | 84 | 83 |

The lack of significant change over the 63 days indicates that Composition A is stable at room temperature emulating storage conditions.

The invention claimed is:

1. A sealant composition comprising:
   (a) an elastomer selected from butyl rubber, polyisobutylene rubber, ethylene-propylene rubber, and mixtures thereof,
   (b) an inorganic filler, and
   (c) an adhesion promoter comprising an epoxy-based silane and an amino-based silane, wherein the weight ratio between the epoxy-based silane and the amino-based silane ranges from 60/40 to 90/10.

2. The composition according to claim 1, wherein the inorganic filler comprises calcium carbonate.

3. The composition according to claim 2, wherein the inorganic filler is a mixture of precipitated calcium carbonate and ground calcium carbonate, and wherein the weight ratio between the precipitated calcium carbonate and the ground calcium carbonate ranges from 50/50 to 30/70.

4. The composition according to claim 2, wherein the inorganic filler is a mixture of precipitated calcium carbonate and ground calcium carbonate.

5. The composition according to claim 1, wherein the epoxy-based silane is of formula (I) or (II):

(I)

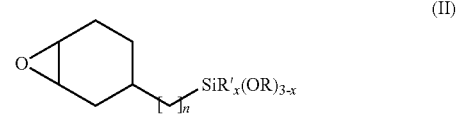

(II)

wherein:
   R and R', the same or different, represent a linear or branched $C_1$ to $C_4$ alkyl group,
   n is an integer equal to 1, 2, 3 or 4, and
   x is an integer equal to 0, 1 or 2.

6. The composition according to claim 5, wherein the epoxy-based silane is selected from 3-glycidoxyethyltrimethoxysilane, 3-glycidoxypropyltrimethoxysilane, 3-glycidoxypropyltriethoxysilane, 2-(3,4-epoxycyclohexyl)propyltrimethoxysilane, 2-(3,4-epoxycyclohexyl)ethylmethyldimethoxysilane, and mixtures thereof.

7. The composition according to claim 1, wherein the amino-based silane is of formula (III):

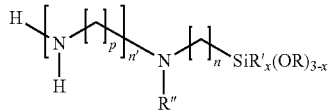

wherein:
R and R', the same or different, represent a linear or branched $C_1$ to $C_4$ alkyl group,
R" represents a hydrogen atom, a linear, branched or cyclic $C_1$ to $C_8$ alkyl group, or $C_4$ to $C_8$ alkylaryl or aromatic group, or a —$([CH_2]_q—NH)_{n'}$—H group,
n is an integer equal to 1, 2, 3 or 4,
n' is an integer equal to 0, 1, 2, 3 or 4,
p is an integer equal to 2, 3 or 4,
q is an integer equal to 2, 3 or 4, and
x is an integer equal to 0, 1 or 2.

8. The composition according to claim 7, wherein the amino-based silane is selected from N-(2-aminoethyl)-3-aminopropyltriethoxysilane, N-(2-aminoethyl)-3-aminopropyltrimethoxysilane, N-[3-(trimethoxysilyl)propyl]ethylenediamine, 3-aminopropyltriethoxysilane, 3-aminopropyltrimethoxysilane, 3-aminopropylmethyldiethoxysilane, N-methylaminopropyltrimethoxysilane, and mixtures thereof.

9. The composition according to claim 1, wherein the weight ratio between the epoxy-based silane and the amino-based silane ranges from 70/30 to 80/20.

10. The composition according to claim 1, wherein the adhesion promoter (c) is a mixture of 3-glycidoxypropyltrimethoxysilane and N-[3-(trimethoxysilyl)propyl]ethylenediamine.

11. The composition according to claim 1, further comprising:
(d) a thermoplastic polymer selected from amorphous poly-alpha-olefin polymer, copolymer of ethylene and vinyl acetate, copolymer of ethylene and ethyl acrylate, copolymer of ethylene and acrylic acid, polyethylene, polypropylene, polyamide styrene-butadiene-styrene and styrene-isoprene-styrene block copolymers, and mixtures thereof.

12. The composition according to claim 1, further comprising:
(e) a pigment.

13. The composition according to claim 1, further comprising:
(f) tackifier resin.

14. The composition according to claim 1, further comprising:
(g) an antioxidant stabilizer.

15. The composition according to claim 1, comprising:
(a) 5 to 65 wt % of at least one elastomer selected from butyl rubber, polyisobutylene rubber, ethylene-propylene rubber, and mixture thereof,
(b) 10 to 60 wt % of at least one inorganic filler,
(c) 0.1 to 5 wt % of an adhesion promoter comprising an epoxy-based silane and an amino-based silane, wherein the weight ratio between the epoxy-based silane and the amino-based silane ranges from 60/40 to 90/10,
(d) 2 to 30 wt % of at least one thermoplastic polymer,
(e) 0 to 5 wt % of at least one pigment,
(f) 5 to 50 wt % of at least one tackifier resin,
(g) 0.1 to 3 wt % of at least one antioxidant stabilizer, in which the sum of components (a), (b), (c), (d), (e), (f) and (g) is 100 wt %.

16. The composition according to claim 1, wherein the weight ratio between the epoxy-based silane and the amino-based silane ranges from 65/35 to 85/15.

17. A method for insulating a glass structure, comprising sealing an edge of said glass structure with the sealant composition according to claim 1.

18. An insulated glass structure comprising two parallel panes of glass separated by a spacer bar, wherein the two panes of glass are bonded to the spacer bar through the sealant composition according to claim 1.

19. An insulated glass structure comprising three parallel panes of glass separated by one or two spacer bars, wherein the three panes of glass are bonded to the spacer bar(s) through the sealant composition according to claim 1.

* * * * *